United States Patent [19]

Vaughan

[11] 3,962,288

[45] June 8, 1976

[54] 1-ALKYL-SUBSTITUTED-1,2,3,4-TETRAHYDROANTHRAQUINONES

[75] Inventor: Lawrence G. Vaughan, Wilmington, Del.

[73] Assignee: E. I. Du Pont de Nemours and Company, Wilmington, Del.

[22] Filed: Mar. 14, 1974

[21] Appl. No.: 451,116

Related U.S. Application Data

[63] Continuation of Ser. No. 264,579, June 20, 1972, abandoned.

[52] U.S. Cl. .............................. 260/369; 423/588
[51] Int. Cl.$^2$ ......................................... C07C 49/68
[58] Field of Search ................................ 260/369

[56] References Cited
UNITED STATES PATENTS

| | | |
|---|---|---|
| 2,495,229 | 1/1950 | Dawsey et al. .......................... 260/369 |
| 2,657,980 | 11/1953 | Sprauer ................................... 260/369 |
| 2,867,507 | 1/1959 | Gleason et al. .......................... 260/369 |
| 3,041,143 | 6/1962 | Dawsey et al. .......................... 260/369 |
| 3,073,680 | 1/1963 | Jenney et al. ........................... 260/369 |
| 3,307,909 | 3/1967 | Reilly ..................................... 423/588 |

OTHER PUBLICATIONS

Beilstein, Handbuch der Organischem Chemie, vol. 7(II), 1948, pp. 666–669.

*Primary Examiner*—Arthur P. Demers

[57] ABSTRACT

1-Alkyl and 1,3-dialkyl substituted-1,2,3,4-tetrahydroanthraquinones are provided which may also be alkyl substituted in the 6- and/or 7- position. These compounds are provided by condensing a naphthoquinone with an alkyl-substituted butadiene dimer, catalytically hydrogenating the adduct, then oxidizing the resulting hexahydro compound to the desired tetrahydroanthraquinone. Alternatively, the condensation product may be oxidized with a cupric compound or with air plus a weak base, and this compound catalytically hydrogenated and then oxidized to the corresponding tetrahydroanthraquinone. The compounds of this invention exhibit superior solubility in solvents commonly used in the cyclic process for manufacturing $H_2O_2$ and thus enhance $H_2O_2$ production.

9 Claims, No Drawings

1-ALKYL-SUBSTITUTED-1,2,3,4-TETRAHYDROANTHRAQUINONES

CROSS-REFERENCE TO RELATED APPLICATION

This application is a continuation of copending application Ser. No. 264,579, filed on June 20, 1972, now abandoned.

BACKGROUND OF THE INVENTION

This invention relates to the preparation and use of alkyl-substituted tetrahydroanthraquinones, and more particularly to 1-alkyl-and 1,3-dialkyl-1,2,3,4-tetrahydroanthraquinones.

The use of alkyl-substituted anthraquinones and their tetrahydro derivatives in cyclic processes for the production of hydrogen peroxide is well known. Ferri Canadian Pat. No. 614,296, issued Feb. 7, 1961, and the following U.S. Pat. Nos. (whose issue dates are shown in parentheses) are representative of the many issued patents relating to anthraquinone processes for producing hydrogen peroxide: Reidl et al. 2,158,525 (5/16/39) and 2,215,883 (9/24/40); Dawsey et al. 2,537,655 (1/9/51), Sprauer 2,657,980 (11/3/53), Harris et al. 2,668,753 (2/9/54) and Hinegardner 2,689,169 (9/14/54); and Darbee et al. 3,062,622 (11/6/62), Hiratsuka et al. 3,038,786 (6/12/62), Dawsey 3,041,143 (6/26/62), Kabisch 3,328,128 (6/27/67), Kabisch et al. 3,488,150 (1/6/70) and Logan et al. 3,493,343 (2/3/70). In some cases, the presence of a limited amount of the tetrahydro form is regarded as advantageous since a higher active quinone concentration in the working solution can be achieved. However, two disadvantages of the tetrahydro form are also recognized.

1. It is less soluble than the parent anthraquinone and will precipitate from solution more readily, and
2. It is oxidized more slowly.

It is important in commercial operations of such anthraquinone processes that the working solution employed have a high hydrogen peroxide synthesis capacity per cycle and that the hydrogen peroxide solution obtained in the extraction step be relatively concentrated. The synthesis capacity per cycle is determined by the solubility of the working intermediate employed, particularly in its anthrahydroquinone form, and of course also by the particular solvent or solvent mixture used, which factors also determine the maximum concentration of hydrogen peroxide obtainable in the extract product solution.

U.S. Pat. No. 3,778,452 issued to Josey et al. on Dec. 11, 1973, the disclosure of which is incorporated herein by reference, discloses a 1,4,4a,9a-tetrahydro-1-alkenyl-9,10-anthraquinone of structural formula

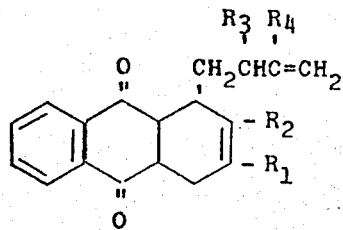

in which each of $R_1$ and $R_4$ is an alkyl group, or either is an alkyl group and the other is hydrogen; and each of $R_2$ and $R_3$ is an alkyl group or hydrogen, provided that $R_2$ is always hydrogen when each of $R_1$ and $R_3$ is hydrogen; said alkyl group or groups being 1 to 8 carbon straight chain hydrocarbon alkyl groups.

Alkenyl anthraquinones can be converted to the corresponding tetrahydroalkylanthraquinones, which have excellent utility as working intermediates in the cyclic process for the production of hydrogen peroxide. This conversion is accomplished by aromatizing the 1-alkenyl-substituted ring with oxygen (air) in the presence of a strong base, followed by hydrogenation according to the process taught by the copending application of Kirchner and Vaughan, Ser. No. 285,124, filed Aug. 31, 1972, the disclosure of which is incorporated herein by reference. According to Kirchner and Vaughan, the alkenyl substituent is converted to the corresponding alkyl substituent

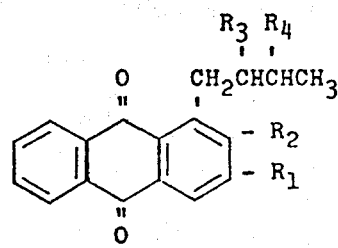

by hydrogenation in the presence of a platinum catalyst on a charcoal support. Hydrogenation in the presence of Raney nickel catalyst converts this to 5,6,7,8-tetrahydro-1-alkylanthraquinones of the formula

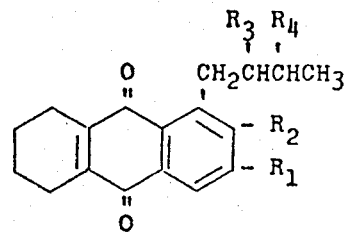

SUMMARY OF THE INVENTION

It has now been discovered that certain tetrahydro-1-alkyl-anthraquinones characterized by having the tetrahydro ring substituted, exhibit outstanding solubilities in both their anthraquinone and anthrahydroquinone forms in working solvents of the types commonly used, and that such anthraquinones are, therefore, particularly well suited for use in cyclic anthraquinone processes for producing hydrogen peroxide. Thus, their high solubilities permit the use of working solutions at substantially greater anthraquinone concentrations than were heretofore practical, with consequent higher synthesis capacities per cycle and relatively concentrated hydrogen peroxide extract products. The high solubility of the anthrahydroquinone form also permits use of less, or even no, hydroquinone-type solvent, i.e., only an anthraquinone-type solvent, in the working solvent. This is highly desirable since extraction of hydrogen peroxide from the working solvent is thereby made easier. If the hydroquinone-type solvent is eliminated entirely, process benefit obviously accrues.

According to the present invention there is provided an alkyl-substituted-1,2,3,4-tetrahydroanthraquinone of the formula

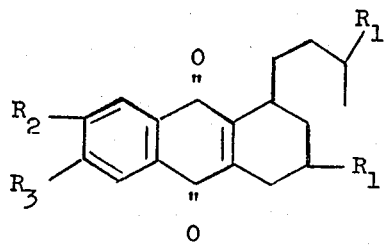

wherein $R_1$ is hydrogen or an alkyl group containing 1–10 carbon atoms and $R_2$ and $R_3$ are hydrogen or alkyl groups containing 1–6 carbon atoms. Preferably, $R_1$ will contain 1–3 carbon atoms, and most preferably will be hydrogen. $R_2$ and $R_3$ will preferably be hydrogen.

There is also provided a 1-alkyl-1,2,3,4-tetrahydroanthraquinone of the formula

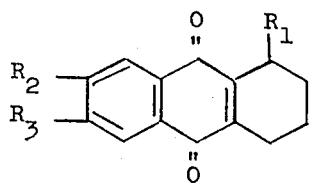

wherein $R_1$ is an alkyl group containing 1–6, and preferably 1–5, carbon atoms and $R_2$ and $R_3$ are hydrogen or an alkyl group containing 1–6 carbon atoms, preferably hydrogen.

There are further provided solutions of the above tetrahydroanthraquinones in water-immiscible solvents and mixed solvents and the use of such tetrahydroanthraquinones and solutions in a cyclic process for the production of hydrogen peroxide by oxidation and reduction of alkylated tetrahydroanthraquinones.

DETAILED DESCRIPTION OF THE INVENTION

Preparation of the tetrahydroanthraquinone compounds of this invention is depicted by the following diagram, wherein compound 5 is that claimed in claim 1.

$R_1$ may be hydrogen or an alkyl having 1–10 carbon atoms. $R_2$ and $R_3$ may be hydrogen or an alkyl having 1–6 carbon atoms. The alkyl groups may be branched.

Compound 3 is prepared by reacting naphthoquinone or a substituted napthoquinone 1 with various diene dimers 2 according to procedures taught by the

CHART I

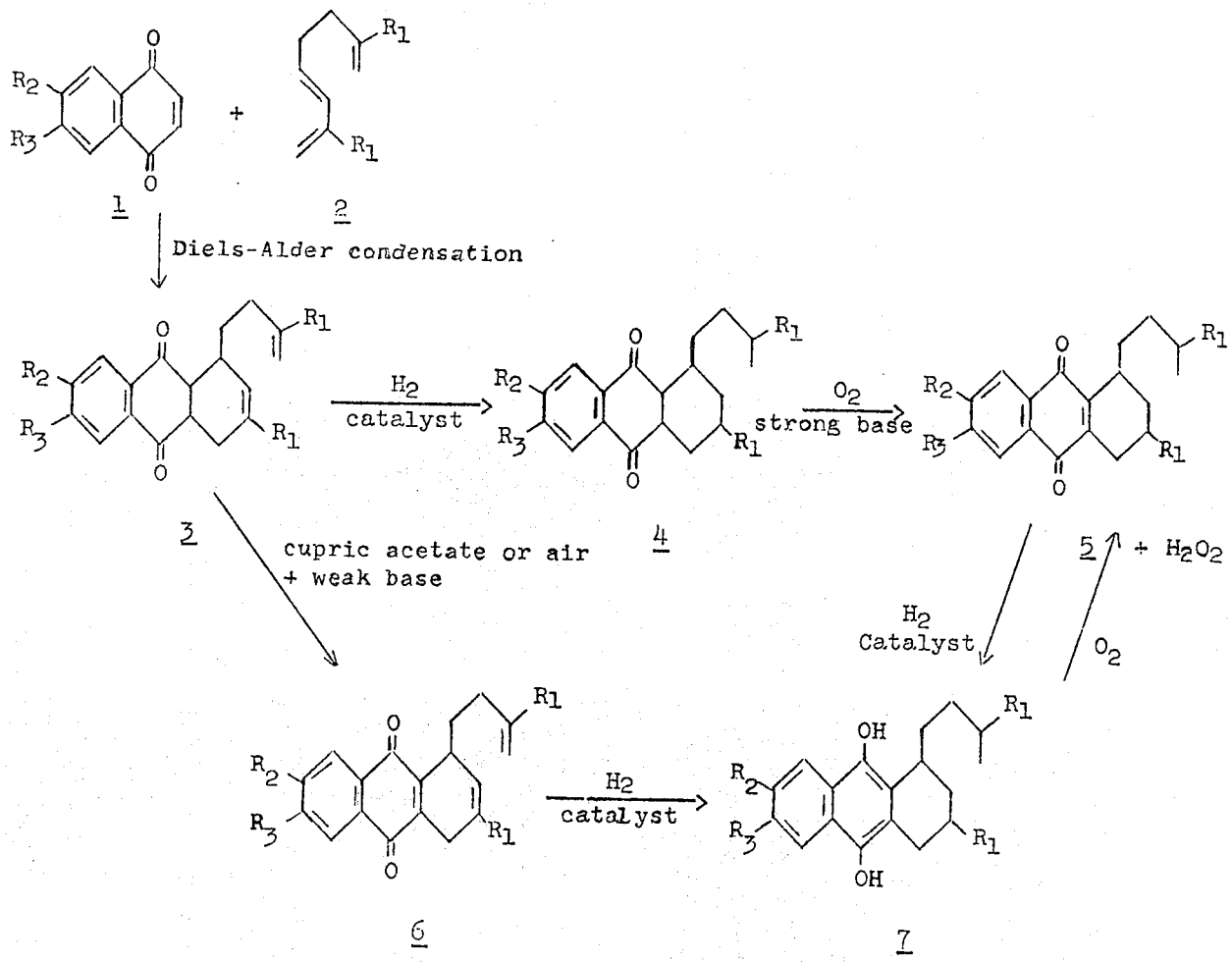

aforementioned U.S. Pat. No. 3,778,452. In brief, the Diels-Alder condensation reaction to produce the 1,4,4a,9a-tetrahydro-1-alkenylanthraquinone of formula 3 is carried out by contacting 1,4-naphthoquinone and a 1,3,7-octatriene or an alkyl-substituted 1,3,7-octatriene at a temperature from about 25° to 150°C. until the desired condensation has occurred. The preferred reaction temperatures range from about 75° to 125°C. The reaction can be carried out in either the presence or the absence of a solvent, although the presence of an organic solvent or diluent is generally preferred. When a solvent is used, it should be one that is inert toward each reactant and the condensation adduct and is preferably a solvent for at least one of the reactants and preferably both. Suitable solvents are: ketones such as acetone and methyl ethyl ketone; ethers such as tetrahydrofuran and dioxane; alcohols such as methanol, ethanol and isopropanol; esters such as ethyl acetate; and hydrocarbons such as benzene and cyclohexane. The condensation adducts can be separated from the reaction mixture, if separation is desired, by conventional methods, e.g., by cooling the reaction mixture to crystallize out the adduct, which can then be removed by filtration, or by evaporating off the solvent, if a solvent is used. Ordinarily, separation of the adduct from the reaction mixture will not be necessary. Generally, the naphthoquinone and octatriene reactants will be employed in approximately equimolar proportions, although either may be employed in considerable excess, if desired.

The reaction to produce compound 4 is carried out by hydrogenating a solution of compound 3 at a temperature of from about 20° to 125°C., preferably 20° to 80°C., in the presence of a Group VIII transition metal or a Raney nickel catalyst and under a hydrogen pressure of from about 0.5 to 100, preferably 1 to 50, atmospheres. The preferred catalysts are those of the platinum metal group and of these, the most preferred catalysts are palladium and platinum. The catalysts may be supported or not and may be supplied in the form of the metal or as a compound thereof, e.g., the oxide, the chloride or the acetate, in which case the compound will be reduced in situ to the active metal catalysts. Catalyst concentrations, calculated as the metal and based upon the weight of the compound to be hydrogenated, ranging from about 0.01 to 100% are generally suitable. The preferred concentrations range from 0.5 to 10%.

Any organic solvent which is inert under the reaction conditions and which will dissolve the compounds to be hydrogenated under the conditions of use can be employed. Illustrative of such solvents are the hydrocarbons such as benzene, cyclohexane and pentane; the ethers such as diethyl ether, tetrahydrofuran and dioxane; the esters such as methyl acetate and ethyl acetate; the alcohols such as methanol, ethanol and isopropanol; and the ketones such as acetone and methyl ethyl ketone.

The oxidation of the 1,2,3,4,4a,9a-hexahydro derivative 4 with molecular oxygen in the presence of a base readily converts such compounds to the tetrahydroanthraquinones of formula 5. Air is the preferred source of molecular oxygen. Suitable strong bases are the alkali metal hydroxides, of which potassium hydroxide is preferred, and strong organic bases such as 1,5-diazabicyclo(4.3.0)non-5-ene (DBN), triethylamine and the quaternary ammonium hydroxides such as tetramethylammonium hydroxide. Although the presence of a solvent or diluent is not essential, it is preferred that the reaction be carried out in the presence of a solvent. Suitable solvents include an alcohol such as methanol or ethanol; a ketone such as acetone or methyl ethyl ketone; an ester such as ethyl acetate; or a hydrocarbon such as benzene or cyclohexane. Reaction temperatures from about 0 to 100°C. are generally suitable and the preferred temperatures range from about 20° to 50°C.

Reduction of compounds of type 5 over a noble metal gives hydroquinones of type 7 which, upon oxidation with air or oxygen, give hydrogen peroxide and are reconverted to 5. The cyclical hydrogenation and oxidation of the keto groups of an anthraquinone is well known in the manufacture of hydrogen peroxide, as may be seen from the various patents referred to above.

An alternative synthesis of compounds of type 5 consists of oxidizing compounds of type 3 to compounds of type 6 with cupric acetate, preferably, or another cupric salt such as cupric chloride, e.g., in an aqueous acetic acid medium. Alternatively, this oxidation may be performed by molecular oxygen. Air is preferred as the source of molecular oxygen and ammonia, sodium acetate and the mono-, di- and trialkylamines such as methylamine, diethylamine, triethylamine and di-isopropylethylamine are examples of suitable weak bases. The reaction can be carried out in the absence of any solvent or diluent; however, it is preferred to utilize one of the solvents or media mentioned above in connection with the oxidation of compound 4. The preferred medium is aqueous ethanol. Reaction temperatures ranging from about 0° to 150°C. are generally suitable and the preferred temperatures range from about 20° to 50°C. Catalytic reduction, as already described in connection with compound 3, converts compound 6 to compound 7. This catalytic reduction may be performed in the hydrogenator of a cyclical process for producing hydrogen peroxide, as described in U.S. Pat. No. 2,657,980, for example, thus permitting compound 6 to be added directly to the hydrogen peroxide process without need for preparing compound 7 separately. In such a case the hydrogenation would involved addition of two equivalents of hydrogen, one to saturate the 1,2,3,4-ring, the other to convert the keto groups to anthrahydro groups.

The preparation of an analogous tetrahydroanthraquinone, 13, is illustrated as follows:

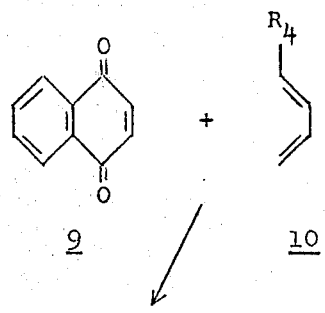

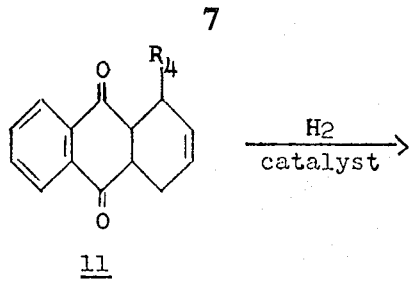

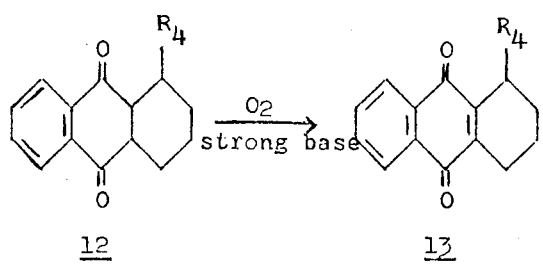

Reaction of a 1,3-diene with naphthoquinone produces adduct 11, analogous to 3, above. Reduction of 11 produces 12, analogous to 4, above. Oxidation of 12 produces 13, a monoalkyl substituted 1,2,3,4-tetrahydroanthraquinone, analogous to 5, above. Reaction procedures are like those already described in connection with the preparation of compound 5. Compound 13 may be used in a cyclic process for producing hydrogen peroxide, as already described.

The invention may be better understood by reference to the following examples. The samples are identified according to Table I.

TABLE I

| SAMPLES SYNTHESIZED AND CHARACTERIZED | |
|---|---|
| Compound | Substituents |
| 3a | $R_1, R_2, R_3 = H$ |
| 3b | $R_1 = H; R_2, R_3 = CH_3$ |
| 3c | $R_1 = CH_3; R_2, R_3 = H$ |
| 3d | $R_1 = C_2H_5; R_2, R_3 = H$ |
| 4a | $R_1, R_2, R_3 = H$ |
| 5a | $R_1, R_2, R_3 = H$ |
| 5b | $R_1 = H; R_2, R_3 = CH_3$ |
| 5d | $R_1 = C_2H_5; R_2, R_3 = H$ |
| 6a | $R_1, R_2, R_3 = H$ |
| 6c | $R_1 = CH_3; R_2, R_3 = H$ |

Compounds 3a–d and 6a and c were prepared according to the procedures described in detail in U.S. Pat. No. 3,778,452 and summarized hereinabove.

EXAMPLE 1

Preparation of 1-n-butyl-1,2,3,4,1a,4a-hexahydroanthraquinone, compound 4a

After catalytic hydrogenation of a sample of adduct 3a, a portion of the solution was filtered and the solvent blown off with nitrogen. The product, after recrystallization from hexane, had an m.p. 75°–76.5°C.

Anal. Calcd. for $C_{18}H_{22}O_2$: C, 79.96%; H, 8.20%; Found: C, 79.84%; H, 8.20%.

In the nmr spectrum of the product (CDCl₃), signals occurred at 7.4–8.2 (4H), 2.8-2.6 (2H), and 0.5-2.5 ppm (16H). The complete absence of signals in the olefinic region confirmed that both double bonds had been saturated.

EXAMPLE 2

Preparation of 1-n-butyl-1,2,3,4-tetrahydroanthraquinone, compound 5a

A solution of 78.0 g. (0.495 mole) naphthoquinone and 56.0 g. (0.52 mole) butadiene dimer in 200 ml. dioxane was heated at 90°–95°C. for one hour, and then at 80°–90°C. for 3 hours. The solution was then cooled and 2.0 g. 10% palladium-on-charcoal (Pd/C) catalyst added. The mixture was then hydrogenated at 42 psi until the theoretical amount of hydrogen was taken up. After removal of the catalyst by filtration and addition of 2 ml. DBN, a slow stream of air was blown through the solution for six hours. The solution was then poured into 2000 ml. water and the mixture extracted three times with 300 ml., 100 ml. and 100 ml. portions of cyclohexane. The combined cyclohexane extracts were dried over anhydrous potassium carbonate, treated with Darco activated charcoal (Atlas Chemical Industries), and then filtered. After removal of the solvent by using a steam bath, 73.0 g. of crude product was obtained (59% yield). The product was purified by chromatography on acidic alumina using cyclohexane eluent. An analytical sample, after recrystallization from methanol, had m.p. 64°–65°C.

Anal. Calcd. for $C_{18}H_{20}O_2$: C, 80.56%; H, 7.51%; Found: C, 80.75%; H, 7.37%.

In the nmr spectrum of the product (CDCl₃), signals occurred at 7.75–8.20 ppm (multiplet, 2H), 7.30–7.75 (multiplet, 2H), 2.80–3.20 (multiplet, 1H), 2.30–2.70 (multiplet, 2H), 1.10–2.10 (multiplet, 10H), 0.70–1.10 (multiplet, 3H).

EXAMPLE 3

Preparation of 1-n-butyl-6,7-dimethyl-1,2,3,4-tetrahydroanthraquinone, compound 5b A 3.0 g. sample of the butadiene dimer-6,7-dimethylnaphthoquinone adduct was dissolved in 100 ml. benzene. After the addition of 0.30 g. 10% Pd/C catalyst, the mixture was hydrogenated at 35 psi for four hours. After removal of catalyst by filtration, five drops DBN were added and the mixture was stirred overnight while exposed to air. The benzene was then blown off with air and the residue chromatographed on acidic alumina with a 9:1 benzene-ethyl acetate solution. The crude product (1.1 g.; 36% yield) was recrystallized from methanol to give an analytical sample with m.p. 88°–90°C.

Anal. Calcd. for $C_{20}H_{24}O_2$: C, 81.04%; H, 8.16%; Found: C, 81.27%; H, 7.83%.

In the nmr spectrum (CDCl₃), signals occurred at 7.72 (singlet, 2H), 2.2–3.2 (complex multiplets, dominated by sharp singlet at 2.36, 9H), and 0.7–2.0 ppm (multiplet, 13H).

EXAMPLE 4

Preparation of
1-(3-ethyl)butyl-3-ethyl-1,2,3,4-tetrahydroanthraquinone, compound 5d A 1.5 g. sample of the Diels-Alder adduct of 2-ethylbutadiene dimer and naphthoquinone was dissolved in 75 ml. tetrahydrofuran and hydrogenated for 6 hours using 0.8 g. 5% Pd/C catalyst. The mixture was then filtered and after the addition of five drops DBN, was vigorously stirred in air for 2 hours. After removal of solvent with air, the residue was chromatographed on acidic alumina with a 9:1 mixture of benzene-ethyl acetate. Removal of solvent under high vacuum from a yellow eluate fraction left the product as a yellow oil, 0.45 g. (30% yield).

Anal. Calcd. for $C_{22}H_{28}O_2$: C, 81.44%; H, 8.70%; Found: C, 81,56%; H, 8.56%.

In the nmr spectrum of the product ($CCl_4$), signals occurred at 7.15–8.30 (multiplets, 4H), 2.45–3.40 (multiplets, 3H), and 0.6–2.3 (complex multiplets, 21H).

EXAMPLE 5

Preparation of
1-n-butyl-1,2,3,4-tetrahydroanthraquinone (from 6a), compound 5a

A 5.0 g. sample of 1,4-dihydro-1-(3-butenyl)anthraquinone (6a, R = H) was dissolved in 100 ml. of ethyl acetate. The solution was then hydrogenated using 0.2 g. 10% Pd/C catalyst. After the absorption of three equivalents of hydrogen, the mixture was filtered to remove the catalyst. It was then stirred at room temperature overnight while exposed to air to oxidize the hydroquinone. After removal of the solvent, the residue was recrystallized from methanol to give 4.2 g. product (83% yield). The gas chromatographic retention time, infrared spectrum, and nmr spectrum of this sample were identical with those of an authentic sample.

EXAMPLE 6

Preparation of
1-ethyl-1,2,3,4,1a,4a-hexahydroanthraquinone, compound 12

A solution of 25.0 g. (0.104 mole) of adduct 11 in 125 ml. ethyl acetate was hydrogenated using 0.75 g. of 10% Pd/C catalyst. The reaction stopped cleanly after taking up the theoretical amount of hydrogen. The solvent was then removed from a portion of the solution, and the residue was recrystallized first from methanol, then from hexane. The product had m.p. 98°–100°.

Anal. Calcd. for $C_{16}H_{18}O_2$: C, 79.31%; H, 7.49%; Found: C, 79.29%; H, 7.41%.

In the nmr spectrum of the product ($CCl_4$), signals occurred at 7.5–8.1 (4H), 2.7–3.4 (2H), 1.2–2.0 (9H), and 0.87 ppm (triplet, J = 6.0 cps) (3H).

EXAMPLE 7

Preparation of
1-ethyl-1,2,3,4-tetrahydroanthraquinone, compound 13

The remainder of the hydrogenated solution from the above experiment was oxidized with air after the addition of 5 drops of DBN. The solvent was then removed and the residue recrystallized twice from methanol. The yield of product, m.p. 66°–67.5°, was 17.1 g. (68.5% yield).

Anal. Calcd. for $C_{16}H_{16}O_2$: C, 79.97%; H, 6.71%; Found: C, 80.14%, H, 6.56%.

In the nmr spectrum of the product ($CCl_4$), signals occurred at 7.4–8.1 (4H), 2.3–3.0 (3H), and 0.8–2.1 ppm (9H).

It has been found that tetrahydroanthraquinones of types 5 and 13, and their corresponding hydroquinones have unexpectedly high solubilities in the solvents used to prepare the so-called "working solution" of the cyclical hydrogen peroxide process. For example, as illustrated in Table II, the tetrahydroanthraquinones 5a, 5d, and 13 are far more soluble (by a factor of at least three) than the widely-used compounds 2-ethyltetrahydroanthraquinone and 2-t-butyltetrahydroanthraquinone. Likewise, as illustrated in Table III, the hydroquinone form 7 of tetrahydroanthraquinones 5a and 13 are about twice as soluble in a variety of working solution solvents as the hydroquinone forms of 2-ethyltetrahydroanthraquinone and 2-t-butyltetrahydroanthraquinone. Of particular significance is the high solubility in xylene, which allows it or related alkyl aromatics to be used as the sole solvent in the "working solution" of a cyclical hydrogen peroxide process. Suitable alkyl aromatics include methyl naphthylene and "Hi-Sol 15," an alkyl benzene mixture sold by Ashland Chemical Co. This high solubility results in greater productivity of hydrogen peroxide per volume of working solution. These advantages are illustrated by the following examples.

EXAMPLE 8

The solubilities of various anthraquinones in a 60:40 percent p-xylene:diisobutylcarbinol mixture at 30°C. are reported in Table II. The solubilities were determined by stirring an excess of the anthraquinone in the solvent mixture at 30°C. for 48 hrs., filtering the resulting mixture through a sintered glass filter to remove undissolved anthraquinone, stripping solvent from a weighed sample of the filtrate under high vacuum and a heat lamp, then weighing the resulting anthraquinone residues. The solubility, expressed as a weight percentage, based upon the weight of the solution $$\frac{\text{wt. of dissolved anthraquinone}}{\text{wt. of solution}} = 100$$

was then calculated.

TABLE II

Anthraquinone Solubilities at 30°C. in
60:40 p-Xylene:Diisobutylcarbinol Mixture

| Anthraquinone | Solubility, % by wt. |
|---|---|
| 2-t-butyl | 26.6 |
| 2-ethyl | 25.6 |
| tetrahydro-2-t-butyl | 6.7 |
| tetrahydro-2-ethyl | 11.3 |
| 1-n-butyl-1,2,3,4-tetrahydro (5a) | >50 |
| 1-(3-ethyl)-butyl-3-ethyl-tetrahydro (5d) | >50 |
| 1-ethyl-1,2,3,4-tetrahydro (13) | 42.4 |

EXAMPLE 9

The solubilities of various tetrahydroanthrahydroquinones in various solvents and solvent mixtures are reported in Table III. The solubilities were determined as follows: A weighed amount of the parent tetrahydroanthraquinone was placed in a flask (provided with a magnetic stirrer) together with weighed amounts of a hydrogenation catalyst (0.45% palladium on activated alumina) and the solvent. The mixture was then hydrogenated until a full equivalent of hydrogen had been absorbed, thereby converting the anthraquinone completely to the corresponding anthrahydroquinone. Sufficient diethyl ether was added near the end of the hydrogenation to dissolve any precipitated anthrahydroquinone. The mixture was then filtered (under hydrogen) to remove the catalyst and the ether was removed from the filtrate under reduced pressure. When the ether-free filtrate contained precipitated anthrahydroquinone, it was slowly warmed (1°C. temperature rise per minute) until the precipitated anthrahydroquinone dissolved, at which point the temperature (i.e., the saturation temperature) was noted and the solubility of the anthrahydroquinone at that temperature was calculated. When the ether-free filtrate did not contain precipitated anthrahydroquinone, it was cooled until precipitation did occur, following which it was slowly warmed and the saturation temperature and solubility at that temperature were determined as indicated. The solubilities reported in Table III are expressed as weight percentages, based upon the weight of the solution.

perature was 65° and a catalyst containing 0.6% palladium on alumina was used. Operation proceeded smoothly for a 41 hour test period, and 60.8 g. of hydrogen peroxide was produced. After shutdown, no degradation products could be detected in the working solution by gas chromatography. A mass balance on quinone charged and recovered showed a recovery of 99.64%.

It will be apparent to one familiar with the cyclical process for $H_2O_2$ production that the tetrahydroanthraquinones of this invention may be mixed in such process with those anthraquinones and tetrahydroanthraquinones commonly used in the working solution. These include 2-ethylanthraquinone, 2-t-butylanthraquinone, their tetrahydro derivatives, as well as any of those disclosed in the patents cited herein. The improved solubility of the compounds of this invention will enhance the productive capacity of such prior art working solutions. In such mixtures the concentration of any given quinone would be about 0–20%, preferably about 0–10%, by weight.

I claim:

1. An alkyl-substituted-1,2,3,4-tetrahydroanthraquinone of the formula

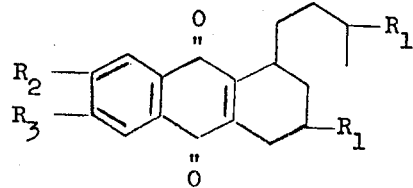

TABLE III

| | Hydroquinone Solubilities | | | |
|---|---|---|---|---|
| Parent Quinone | Solvent | Concentration % | Saturation Temperature | % $H_2O_2$ Recovered |
| 2-t-Butyl-5,6,7,8-tetrahydroanthraquinone | p-Xylene | 5.6 | 58°C | |
| | Anisole | 4.8 | −3° | |
| | Methylnaphthalene | 5.3 | 0° | |
| | 90% Methylnaphthalene 10% DIBC | 5.0 | −7° | |
| | 90% Methylnaphthalene 10% Methylcyclohexyl acetate | 5.0 | −5° | |
| | 90% Xylene 10% Trioctylphosphate | 4.6 | 25° | |
| 2-Ethyl-5,6,7,8-tetrahydroanthraquinone | p-Xylene | 5.7 | 90° | |
| | Anisole | 4.9 | 51° | |
| | Methylnaphthalene | 4.9 | 80° | |
| | 90% Methylnaphthalene 10% DIBC | 5.3 | 70° | |
| | 90% Methylnaphthalene 10% Methylcyclohexyl acetate | 4.9 | 70° | |
| | 90% Xylene 10% Trioctylphosphate | 5.4 | 81° | |
| 1-n-Butyl-1,2,3,4-tetrahydroanthraquinone (5a) | p-Xylene | 10.5 | 53° | 92.0 |
| | Anisole | 10.0 | 9° | 94.1 |
| | Methylnaphthalene | 9.3 | 0° | 95.2 |
| | 90% Methylnaphthalene 10% DIBC | 9.4 | −8° | 94.7 |
| | 90% Methylnaphthalene 10% Methylcyclohexyl acetate | 9.3 | −6° | 94.1 |
| | 90% Xylene 10% Trioctylphosphate | 10.4 | 40° | 92.6 |
| 1-Ethyl-1,2,3,4-tetrahydroanthraquinone (13) | p-Xylene | 10.5 | 62° | 95.3 |

EXAMPLE 10

The ability of 1-n-butyl-1,2,3,4-tetrahydroanthraquinone (5a) to produce hydrogen peroxide over an extended period was demonstrated by a run in a small cyclic pilot plant which required 1200 ml. of working solution. The working solution used contained 6% of the quinone in a 60/40 mixture (by volume) of Hi-Sol-15 DIBC (diisobutylcarbinol). The hydrogenator temwherein $R_1$ is hydrogen or an alkyl group containing 1–10 carbon atoms and $R_2$ and $R_3$ are hydrogen or alkyl groups containing 1–6 carbon atoms.

2. The tetrahydroanthraquinone of claim 1 wherein $R_1$ is an alkyl group containing 1–3 carbon atoms.

3. The tetrahydroanthraquinone of claim 2 wherein $R_2$ and $R_3$ are hydrogen.

4. The tetrahydroanthraquinone of claim 1 which is 1-n-butyl-1,2,3,4-tetrahydroanthraquinone.

5. The tetrahydroanthraquinone of claim 1 which is 1-n-butyl-6,7-dimethyl-1,2,3,4-tetrahydroanthraquinone.

6. The tetrahydroanthraquinone of claim 1 which is 1-(3-methyl)butyl-3-methyl-1,2,3,4-tetrahydroanthraquinone.

7. The tetrahydroanthraquinone of claim 1 which is 1-(3-ethyl)butyl-3-ethyl-1,2,3,4-tetrahydroanthraquinone.

8. A solution of a tetrahydroanthraquinone of claim 1 in a water-immiscible solvent.

9. A solution of the tetrahydroanthraquinone of claim 2 in a water-immiscible solvent.

* * * * *